US006463481B1

(12) United States Patent
Lupien, Jr. et al.

(10) Patent No.: US 6,463,481 B1
(45) Date of Patent: Oct. 8, 2002

(54) DIRECT MEMORY ACCESS CONTROL SYSTEM FOR A DIGITAL SCANNER

(75) Inventors: Gordon F. Lupien, Jr., Ontario, NY (US); Robert M. Chapin, Rushville, NY (US); Anthony M. Frumusa, Penfield, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/452,713

(22) Filed: Dec. 2, 1999

(51) Int. Cl.[7] .................................................. G06F 3/00
(52) U.S. Cl. ............................ 710/22; 710/62; 710/72; 710/68; 710/308
(58) Field of Search .......................... 710/22–28, 62–68, 710/72–74, 305–310; 382/276–308

(56) References Cited

U.S. PATENT DOCUMENTS

| | | | |
|---|---|---|---|
| 4,821,107 A | 4/1989 | Naito et al. ................. 358/256 |
| 4,947,345 A | 8/1990 | Paradise et al. ............. 364/519 |
| 5,016,114 A | 5/1991 | Sakata et al. ............... 358/404 |
| 5,021,892 A | 6/1991 | Kita et al. ................... 358/468 |
| 5,031,032 A | 7/1991 | Perregauz et al. ............ 358/44 |
| 5,038,218 A | 8/1991 | Matsumoto ................. 358/296 |
| 5,047,955 A | 9/1991 | Shope et al. ................ 364/519 |
| 5,113,494 A | 5/1992 | Menendez et al. .......... 395/163 |
| 5,170,340 A | 12/1992 | Prokop et al. .............. 364/143 |
| 5,175,633 A | 12/1992 | Saito et al. ................. 358/406 |
| 5,223,948 A | 6/1993 | Sakurai et al. .............. 358/404 |
| 5,233,346 A | 8/1993 | Minerd et al. .......... 340/825.52 |
| 5,276,799 A | 1/1994 | Rivshin ...................... 395/162 |
| 5,301,262 A | 4/1994 | Kashiwagi ................. 395/117 |
| 5,303,341 A | 4/1994 | Rivshin ...................... 395/162 |
| 5,307,458 A | 4/1994 | Freiburg et al. ............. 395/162 |
| 5,339,139 A | 8/1994 | Fullerton et al. ............ 355/215 |
| 5,430,536 A | 7/1995 | Fullerton et al. ............ 355/320 |
| 5,473,513 A | 12/1995 | Quinn ........................ 361/760 |
| 5,545,913 A | 8/1996 | Quinn et al. ................ 257/443 |
| 5,552,828 A | 9/1996 | Perregaux ................... 348/315 |
| 5,579,452 A | 11/1996 | Ambalavanar et al. ..... 395/115 |
| 5,602,579 A | 2/1997 | Ambalavanar et al. ..... 347/240 |
| 5,604,362 A | 2/1997 | Jedlicka et al. ............. 257/233 |
| 5,655,138 A * | 8/1997 | Kikinis ........................ 710/68 |
| 5,687,297 A | 11/1997 | Coonan et al. ............. 395/102 |
| 5,691,760 A | 11/1997 | Hosier et al. ............... 347/238 |
| 5,710,873 A * | 1/1998 | Romano et al. ............ 395/115 |
| 5,715,477 A * | 2/1998 | Kikinis ........................ 710/68 |
| 5,748,344 A | 5/1998 | Rees .......................... 358/505 |
| 5,852,742 A * | 12/1998 | Vondran, Jr. et al. ......... 712/28 |
| 5,920,685 A * | 7/1999 | Romano et al. ............ 395/114 |
| 5,940,585 A * | 8/1999 | Vondran, Jr. et al. ....... 358/430 |
| 5,954,807 A * | 9/1999 | Kikinis ........................ 710/68 |
| 5,999,710 A * | 12/1999 | Smith et al. ................ 395/114 |
| 6,002,814 A * | 12/1999 | Chadez ...................... 382/303 |
| 6,071,193 A * | 6/2000 | Suzuoki ....................... 463/31 |
| 6,145,069 A * | 11/2000 | Dye ............................ 711/170 |
| 6,170,031 B1 * | 1/2001 | Clay .......................... 710/130 |
| 6,292,594 B1 * | 9/2001 | Iwai ........................... 382/298 |

FOREIGN PATENT DOCUMENTS

EP 0705023 A2 * 4/1996

* cited by examiner

*Primary Examiner*—Jeffrey Gaffin
(74) *Attorney, Agent, or Firm*—P. F. Daebeler

(57) ABSTRACT

The present invention generally relates to a digital scanner for scanning images. More specifically, the present invention is directed to a method and apparatus for quickly processing and storing digital data in memory.

20 Claims, 12 Drawing Sheets

DIRECT MEMORY ACCESS CONTROL SYSTEM FOR A DIGITAL SCANNER

FIELD OF THE INVENTION

The present invention generally relates to a digital scanner for scanning images. More specifically, the present invention is directed to a method and apparatus for accurately scanning documents and for processing digital data to provide digital images stored in memory, which can be retrieved for printing on support material or for displaying on a display screen.

BACKGROUND OF THE INVENTION

In a conventional digital scanner, a light source is used to illuminate a document having the image to be scanned. The conventional digital scanner also includes a platen glass upon which the document rests and a platen cover. The light emmitted by the light source illuminates the document and is reflected off and imaged by an optical system or lens system towards either a CCD sensor array or full width array, which converts the reflected light into electrical signals which are eventually converted into digital image data. An image processing circuit electronically registers the image, and converts the electrical signals into digital image data so that the digital image data can be utilized by an image output terminal, network citizen, or memory device.

In the prior art, a printer or other digital imaging system is typically coupled to a digital scanner for scanning an original image (e.g. document) and. employs an initial step of charging a photoconductive member (photoreceptor) to a substantially uniform potential. The charged surface of the photoconductive member is thereafter exposed to a light image of an original document to selectively dissipate the charge thereon in selected areas irradiated by the light image. This procedure records an electrostatic latent image on the photoconductive member corresponding to the informational areas contained within the original document being reproduced. The latent image is then developed by bringing a developer including toner particles adhering triboelectrically to carrier granules into contact with the latent image. The toner particles are attracted away from the carrier granules to the latent image, forming a toner image on the photoconductive member, which is subsequently transferred to a copy sheet. The copy sheet having the toner image thereon is then advanced to a fusing station for permanently affixing the toner image to the copy sheet.

The approach utilized for multicolor electrostatographic printing is substantially identical to the process described above. However, rather than forming a single latent image on the photoconductive surface in order to reproduce an original document, as in the case of black and white printing, multiple latent images corresponding to color separations are sequentially recorded on the photoconductive surface. Each single color electrostatic latent image is developed with toner of a color complimentary thereto and the process is repeated for differently colored images with the respective toner of complimentary color. Thereafter, each single color toner image can be transferred to the copy sheet in super-imposed registration with the prior toner image, creating a multi-layered toner image on the copy sheet, Finally, this multi-layered toner image is permanently affixed to the copy sheet in substantially conventional manner to form a finished copy.

SUMMARY OF THE INVENTION

In one embodiment, there is a direct memory access controller, coupled to a data compression unit and FIFO, for storing digital data in a memory comprising: a compression and decompression bus control logic unit; a bypass interface; a data selector; a computing unit instructing the data selector to select the routing of digital data by way of the bypass interface or by way of the compression and decompression bus control logic unit; a data packer receiving the selected digital data from the data selector and packing the digital data into words; and a write DMA master receives the words of digital data from the data packer and places the words into blocks of digital data and stores the blocks of digital data in the memory. The blocks of digital data are transferred from the direct memory access controller to the memory by way of a video bus.

The data compression unit can be one of a JPEG and ITU G3/G4. The direct memory access controller further comprises a second data compression unit, wherein the data compression unit is an ITU G3/G4 and the second data compression unit is a JPEG. The data selector transmits the selected data in packets to the data packer. The data packets can comprise one of eight bits, sixteen bits and 24 bits. The data packer rearranges the digital data to form words of digital data having a required bit length. The bit length of the words can be thirty-two.

The write DMA master includes registers. The registers configure starting addresses and block size for a front block of digital data and a back block of digital data in the write DMA master, wherein the front block of digital data is the block of digital data currently being transferred by the write DMA master and the back block of digital data is the next block of digital data to be transferred by the write DMA master. The back block of digital data is subsequently copied into the front block for transfer and the write DMA master subsequently interrupts a computing unit, which transmits the new address and block size of the next back block. The write DMA master includes an internal FIFO. The write DMA master monitors the write DMA master internal FIFO threshold so that when enough digital data has been written to the internal FIFO, the digital data is burst onto a video bus for storage in the memory. The write DMA master includes an address counter, a data counter and a main state machine for video bus phase control.

A direct memory access method for storing digital data, comprising: (a) initializing DMA controller having a write DMA master; (b) scanning images to provide digital data to a data packer; (A c) writing words of digital data from data packer to write DMA master internal FIFO; (d) writing digital data to memory starting at the front block address in bursts until the transfer of digital data for the front block is completed; (e) loading write DMA master back block address and size into front block and next block address and size into write DMA master front block; and (f) repeating steps (c) through (e) while performing step (c) until all of the images are scanned and all of the digital data is stored in memory.

The digital data is compressed by a data compression unit before the data packer receives the digital data. The data compression unit is one of a JPEG and ITU G3/G4. The data compression unit further comprises selecting a data compression unit from a plurality of data compression units to compress the digital data and compressing the digital data before the data packer receives the digital data. The data compression units can be a JPEG and ITU G3/G4.

A direct memory access method for storing digital data, comprising: (a) initializing image processing unit and data compression unit; (b) selecting path is of digital data in DMA controller; (c) setting width of words of digital data in data packer; (d) initializing write DMA master front block and back block addresses and sizes; (e) setting threshold and burst size of write DMA master internal FIFO; (f) enabling write DMA master; (g) scanning images to provide digital data; (h) writing words of digital data from data packer to write DMA master internal FIFO for front block; (i) writing digital data to memory starting at the front block address in bursts until the transfer of digital data for the front block is completed; (j) loading write DMA master back block address and size into front block and next block address and size into write DMA master front block; and (k) repeating steps (h) through (j) while performing step (g) until the transfer of digital data is complete.

DESCRIPTION OF THE PREFERRED EMBODIMENTS

Figure 1:
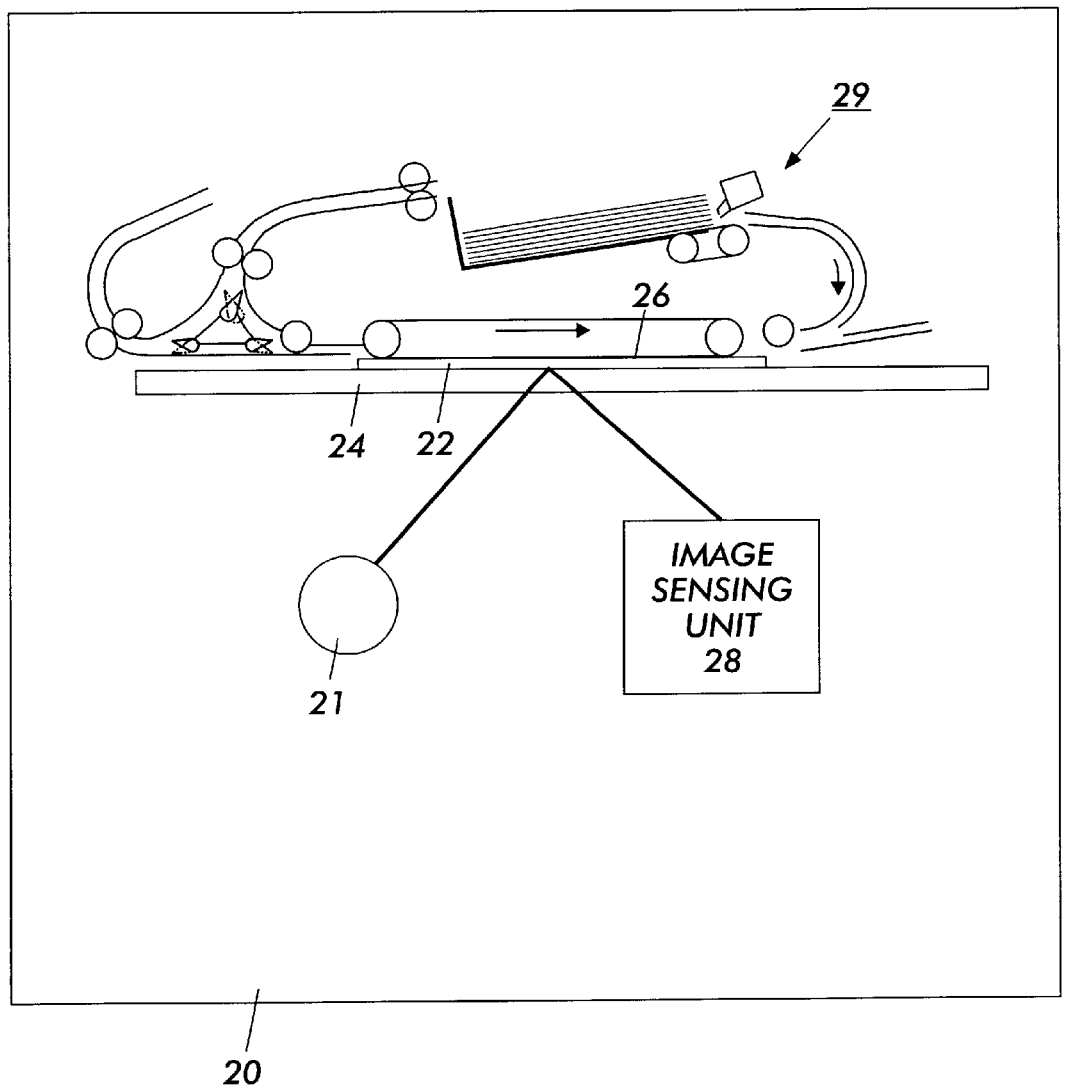
FIG. 1 is a diagram illustrating components of a conventional digital scanner.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined in the appended claims.

For a general understanding of the present invention, reference is made to the drawings. In the drawings and in the specification, like reference numerals have been used throughout to designate identical or equivalent elements or steps.

The present invention addresses the need for fast, high quality digital scanners, capable of being connected to a wide array of copiers, printers, computers, networks, facsimile machines, etc., and capable of scanning and producing complex and interesting images to be stored, printed or displayed. The images may include text, graphics, and scanned or computer-generated images. Therefore, the present invention is directed toward a digital scanner capable of quickly acquiring, processing, storing and outputting digital images of documents.

FIG. 1 illustrates components of a scanning unit 20 in a digital scanner. In the scanning unit 20, a light source 21 is used to illuminate a document 22 to be scanned. In a platen type-scanning situation, the document 22 usually rests upon a glass platen 24 which supports the document 22 for scanning purposes. The document may be placed on the glass platen 24 by an operator. Alternatively, the scanning unit 20 may include a feeder or document handler 29, which places the document on the glass platen 24. Another example of a feeder is shown in U.S. Pat. No. 5,430,536.

On top of the glass platen 24 and the document 22, a backdrop portion (platen cover) 26 is placed so as to prevent stray light from leaving the scanning area and to provide a background from which an input document can be distinguished. The backdrop portion 26 is part of document handler 29. The backdrop portion 26 is the surface or surfaces that can be scanned by an image-sensing unit 28 when a document is or is not present in the scanning station. The light reflected from the document passes through a lens subsystem (not shown) so that the reflected light impinges upon an image sensing unit 28, such as a charged coupled device (CCD) array or a full width array. An example of a full width array is found in U.S. Pat. No. 5,473,513. U.S. Pat. Nos. 5,748,344; 5,552,828; 5,691,760; 5,031,032; 5,545,913; and 5,604,362 provide examples of different full width arrays. A full width array typically comprises one or more linear arrays of photosites, wherein each linear array may be sensitive to one or more colors. In a full color digital scanner, the linear arrays of photosites are used to produce electrical signals which are converted to color image data representing the document that is being scanned. However, in a black/white scanner, preferably only one linear array of photosites is utilized to produce electrical signals which are converted to the black and white image data representing the image of the document, which was scanned.

Figure 2:
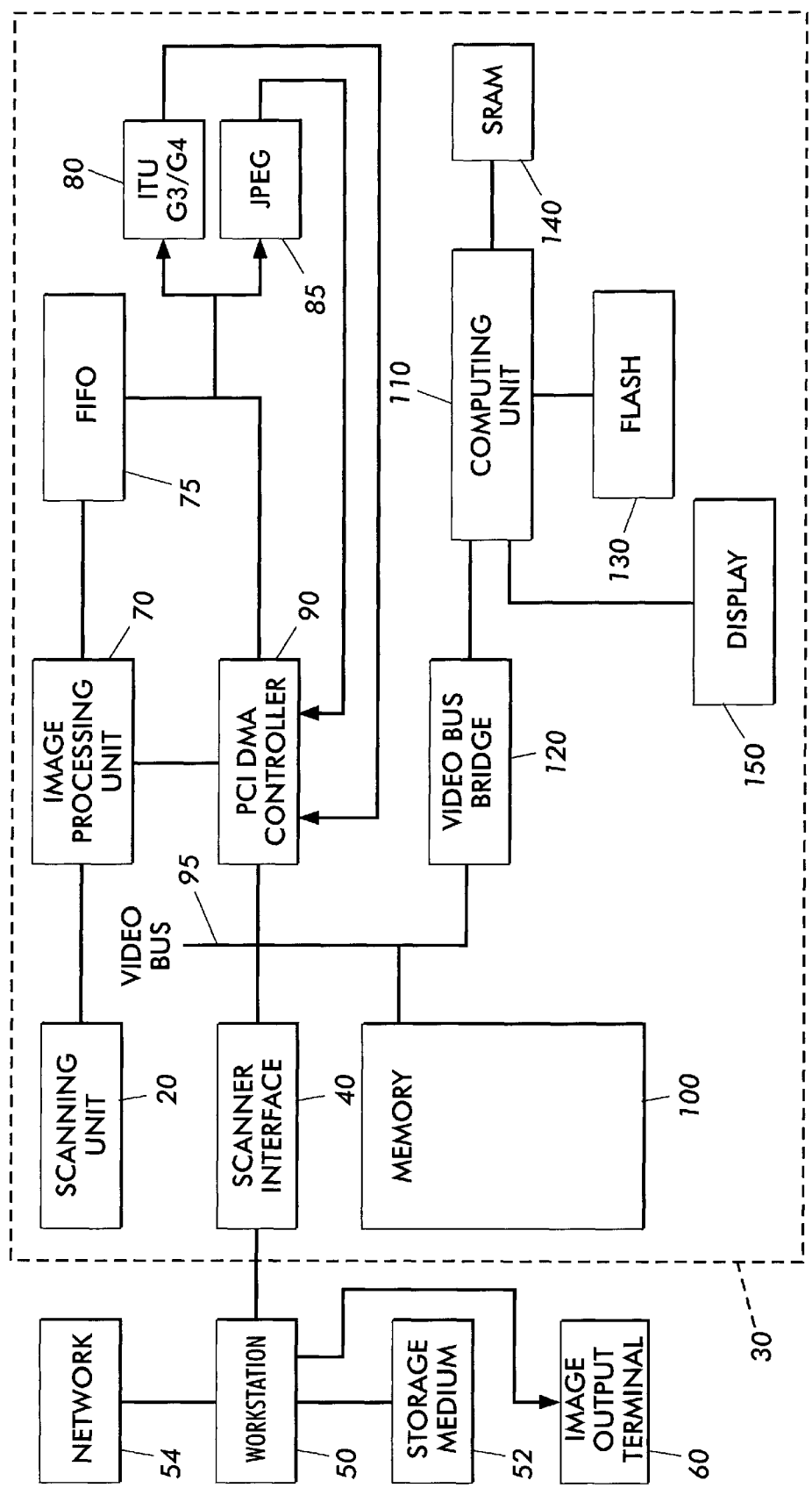
FIG. 2 is a block diagram illustrating the electronic architecture of a digital scanner coupled to a workstation, network, storage medium and image output terminal in accordance with embodiments of the present invention.

FIG. 2 is a block diagram illustrating the electronic architecture of a digital scanner 30 including the scanning unit 20. The digital scanner 30 is coupled to a workstation 50 by way of a scanner interface 40. An example of a scanner interface 40 is a SCSI interface. Examples of the workstation 50 include a personal computer and a computer terminal. The workstation 50 includes and/or accesses a storage medium 52. The workstation 50 is preferably adapted to communicate with a computer network 54, and to communicate with the Internet either directly or through the computer network 54. The digital scanner 30 is preferably coupled to at least one image output terminal (IOT) 60, to such as a printing system.

The scanning unit 20 scans an image and converts the analog signals received by the image sensing unit 28 into digital signals (digital data). An image processing unit 70 registers each image, and preferably executes signal correction to enhance the digital signals. As the image processing unit 70 continuously process the digital signals, the FIFO (first in first out buffer) 75 temporarily stores the digital data outputted by the image processing unit 70, and transmits the digital data to the International Telecommunications Union (ITU) G3/G4 80 and Joint Photographic Experts Group (JPEG) 85 in bursts, so that the processed digital data is compressed. Other data compression units may be substituted for ITU G3/G4 80 and JPEG 85. The compressed digital data is stored in memory 100 preferably by way of Peripheral Component Interconnect Direct Memory Access (PCI DMA) Controller 90 and video bus 95. Alternatively, an operator may not wish to compress the digital data. The operator may bypass the compression step so that the digital data processed by the image processing unit 70 is sent through the FIFO 75 and directly stored in memory 100 by way of PCI DMA Controller 90.

A computing unit 110, such as a microprocessor, is coupled to the scanner interface 40, memory 100 and PCI DMA Controller 90 by way of the video bus 95 and video bus bridge 120. The computing unit 110 is also coupled to a FLASH 130, static RAM 130, and display 150. The computing unit 110 is also connected to the scanning unit 20 and the image processing unit 70 by way of a control/data bus. For, example, the computing unit 110 may be communicating with the image processing unit 70 through the video bus 95 and/or PCI DMA Controller 90. Alternatively, the computing unit 110 may communicate directly with different components such as the image processing unit 70 by way of control/data bus(es) (not shown).

Figure 3:
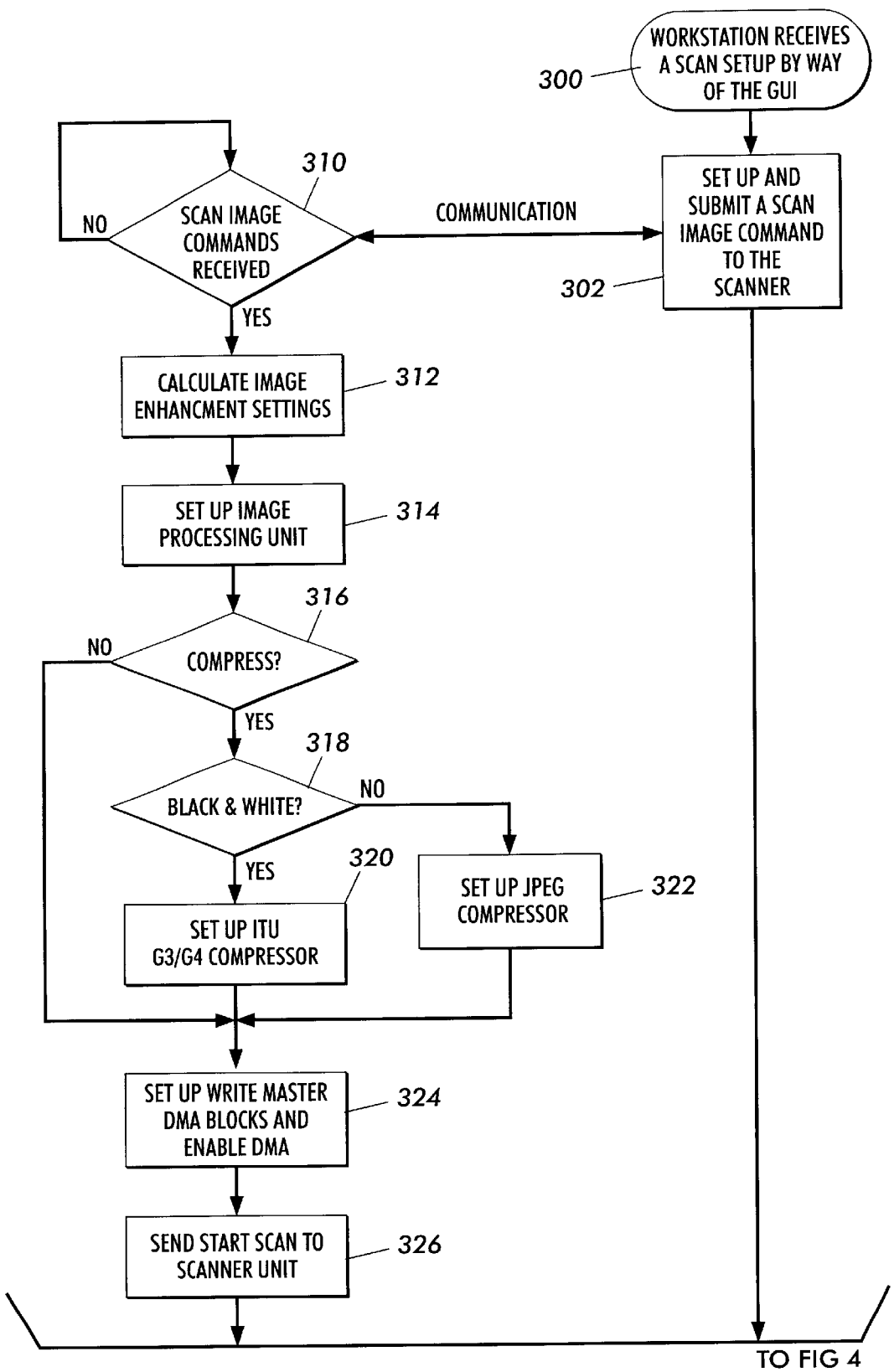
FIGS. 3–4 are flow charts for a scanner, which scans and processes an image.
Figure 4:
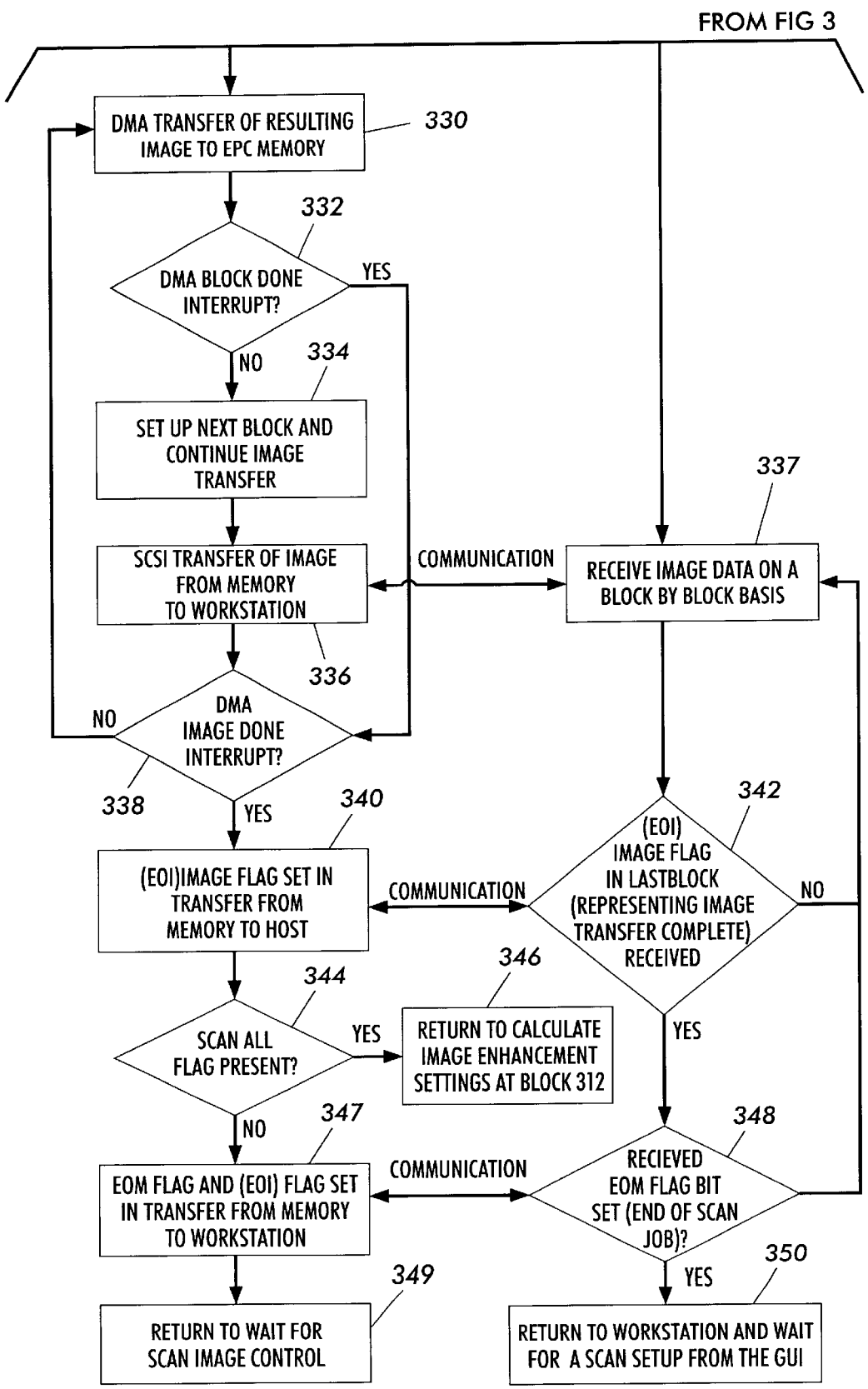

FIGS. 3–4 are flow charts for a digital scanner 30, which scans and processes an image, and which is coupled preferably to a workstation 50. The workstation 50 preferably includes a graphical user interface. The digital scanner 30 may also be connected to a network, main frame computer through a computer terminal, or other host-computing unit. The workstation 50 or other host computing units are capable of being connected to the Internet or any other type of network.

As shown in the flow charts of FIGS. 3–4 and described hereafter, images (digital data) are first processed by the digital scanner 30, stored in memory 100 and then transferred to the workstation 50. The digital scanner 30 transfers processed images from memory 100 while concurrently scanning, processing, and storing new images. There is no interdependence between the scanning of images and transferring of images from memory 100 to workstation 50 unless memory 100 is filled or empty. If the memory 100 is filled, then the scanning stops to permit additional transfer of images from memory 100 to workstation 50. Once the memory 100 is empty, then transfer of images from memory 100 to workstation 50 stops.

More specifically, the workstation 50 receives a scan setup command from a user by way of a graphical user interface (300) and submits a scan image command to the digital scanner 30 by way of scanner interface 40 to memory 100 (302). The scanner interface 40 notifies the computing unit 110 that a scan command has been received. The computing unit 110 retrieves the scan command from memory 100. The computing unit 110 assists in the initialization of several components in the digital scanner 30. Once the scan image command is received (310), image enhancement settings are calculated (312), and the image processing unit 70 is initialized (314). If the computing unit 110 had been notified that the user or operator did not wish the digital data received by way of the scan to be compressed (316), then the write master DMA blocks are set up (324). If the computing unit 110 had been notified by workstation 50 that compression of the digital data (representing the image) was required (316) and that the digital image is to be processed as black and white (318) then the ITU G3/G4 80 is set up (320). If the computing unit 110 had been notified that compression of the digital data (representing the image) was required (316) and that the digital image is to be processed as color (318), then the JPEG 85 is set up (322). Subsequently, the write master DMA blocks are set up (324), (which will be discussed in greater detail with reference to FIGS. 5–7). The computing unit 110 sends the start scan command to scanner unit 20.

The PCI DMA Controller 90 transmits the digital data received from the scanning unit 30 and processed by the image processing unit 70 in direct memory access (DMA) blocks to the memory 100 (330). The digital data may or may not have been compressed by the ITU G3/G4 80 or JPEG 85. The digital scanner 30 may also be transferring digital data in DMA blocks of the scanned image from memory 100 to the workstation 50 by way of scanner interface 40 at the same time (332–338).

If all of the DMA blocks for transfer from memory 100 to the workstation 50 are completed, then the computing unit 110 of the digital scanner 30 is notified by the PCI DMA Controller 90 when the transfer of an image (represented by digital data) to memory 100 is complete (338). If all of the image has not been transferred to memory 100 by the PCI DMA Controller 90, then the transfer of the image to memory 100 continues (330). If all of DMA blocks for transfer from memory 100 to the workstation 50 by way of the scanner interface 40 are not completed (332), then the next DMA block is set up and the digital (image) data transfer to workstation 50 continues (334). The transfer of the digital image from memory 100 to workstation 50 (336) by way of scanner interface 40 is preferably performed on a DMA block by block basis (337).

If the direct memory access transfer of the scanned image to memory 100 is completed and the block by block transfer of digital data from memory 100 to the workstation 50 is completed, then digital scanner 30 and workstation 50 perform final checks to ensure that all digital data representing the scanned image has been transferred and stored. The scanner interface 40 sets an end of image (EOI) flag and transmits the EOI flag (340) to the workstation 50, which indicates that the transfer of an image from the digital scanner 30 to the workstation 50 is complete (342).

Once the current scan is complete, then the scanning unit 20 checks the scan all flag, which indicates that the current scan job is not finished. (340). If the scan all flag is set, the digital scanner 30 returns to recalculate the image enhancement settings (346) so that the scan of the next scan job can begin.

If the scan all flag in the scanning unit 20 is not set, the scan job is complete and the computing unit 110 sets the end of media (EOM) flag (347) when transferring the last block of data from the memory 100 of the digital scanner (347) to workstation 50 (348), which already has the EOI flag set. Then, the digital scanner 30 waits for a new scan image (349) command from the workstation 50. This happens after the user has used the graphical user interface to set up the next scan job (350).

Figure 5:
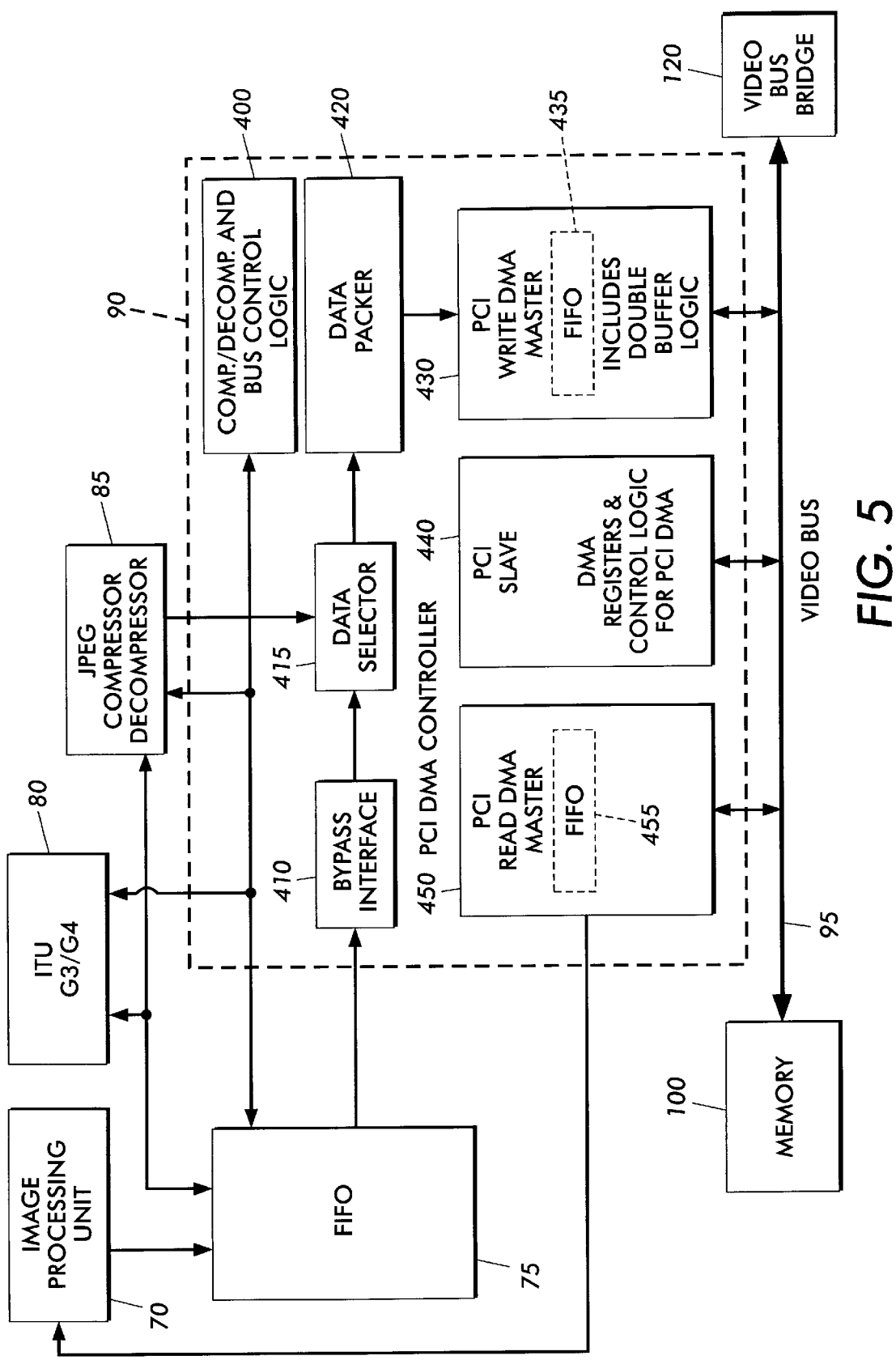
FIG. 5 is a block diagram illustrating the direct memory access control system in accordance with the present invention.

FIG. 5 is a block diagram illustrating the direct memory access control system in accordance with the present invention. The PCI DMA Controller 90 receives digital data directly from the FIFO 75 or compressed digital data from the JPEG 85 or ITU G3/G4 80. The compression/decompression and bus control logic 400 of the PCI DMA Controller 90 interfaces with the FIFO 75, ITU G3/G4 80 and JPEG 85. A data selector 415 permits the computing unit 110 to select the routing of digital data by way of the bypass interface 410 or the routing of compressed digital data by way of the compression/decompression and bus control logic 400 as shown in FIG. 5. The data selector 415 transmits the selected digital data to the data packer 420, which rearranges and packs the digital data into words of the required length in bits. For example, the data selector 415 may transmit packets of 8, 16, or 24 bits of digital data to the data packer 420, which preferably places the bits into 32 bit packets or words. The order of the digital data is set by the computing unit 110. The data packer 420 transmits the words of digital data to the PCI Write DMA Master 430, which places the words of digital data into blocks of digital data for storage in memory 100 by way of video bus 95. The PCI DMA Controller 90 also communicates with processing unit 110 by way of the video bus 95 and video bus bridge 120.

The PCI DMA Controller 90 also retrieves digital data, which is stored in memory 100, for further processing by way of the PCI Read DMA Master 450. This digital data is transmitted in bursts to the image processing unit 70. After processing the digital data, the PCI DMA Controller 90 can store the processed digital data in memory 100 as discussed above.

More specifically, both the PCI Write DMA Master 430 and the PCI Read DMA Master 450 include an internal FIFO (435, 455), an address counter, a data counter, a main state machine for video bus phase control, and registers to hold the initial configurations of the PCI Write and Read DMA Masters 430, 450. Each FIFO (435, 455) is a rubber band that allows digital data to be collected into a PCI burst size set by the PCI Write DMA Master 430 or the PCI Read DMA Master 450 from the video bus 95. On a PCI Write DMA Master 430, the internal FIFO 435 is in front of the rest of the data path of the PCI Write DMA Master 430. This permits the PCI Write DMA Master 430 to monitor the FIFO 435 threshold until enough digital data has been written to the FIFO 435 for a burst on the video bus 95. The PCI Read DMA Master 450 has the FIFO 455 on the end of the data path in the PCI Read DMA Master 450. This permits the PCI Read DMA Master 450 to monitor the FIFO 455 threshold until enough space is available in the FIFO 455 to hold a full burst of data during a read operation.

The registers in the PCI Write DMA Master 430 and the PCI Read DMA Master 450 configure the starting address and block size for two blocks of data. These blocks are the front block and the back block. The front block is the block the PCI Write DMA Master 430 or PCI Read DMA Master 450 is currently utilizing. The block addresses and counters for the next block to be transferred are preferably loaded from the front block. When the digital data in the front block has been transferred by the PCI Write DMA Master 430 or the PCI Read DMA Master 450, the starting address and the block size of. the back block is preferably copied into the front block and data transfer begins.

At this point, the computing unit 110 is interrupted by either DMA Master 430, 450 to write a new address and block size into the back block The PCI Slave 440 functions as the interface between the computing unit 110 and the 15 other components of the PCI DMA Controller 90 so that the new address and block size can be written into the back block in either DMA Master 430, 450.

This new address and block size will be copied to the front block when the current transfer of digital data is complete. This cycle repeats until the image has been transferred.

Preferably, the address counter contains the address of the next word to be transferred. As data is transferred, the address counter is incremented. Alternatively, if the burst size is always the same number of words, then the address counter is incremented by a burst size when a burst is started. The address is used on the video bus 95 only at the start of the transfer, so incrementing the address by the burst size is possible.

A data counter is incremented with the transfer of every word of digital data. This data counter is checked for burst size and for block size. When the burst size is reached, the current PCI cycle is complete and the transfer of another burst of words is started. When the block size is reached, the computing unit 110 is interrupted for the next block address and block size as discussed above until all of the digital (image) data has been transferred.

Figure 6:
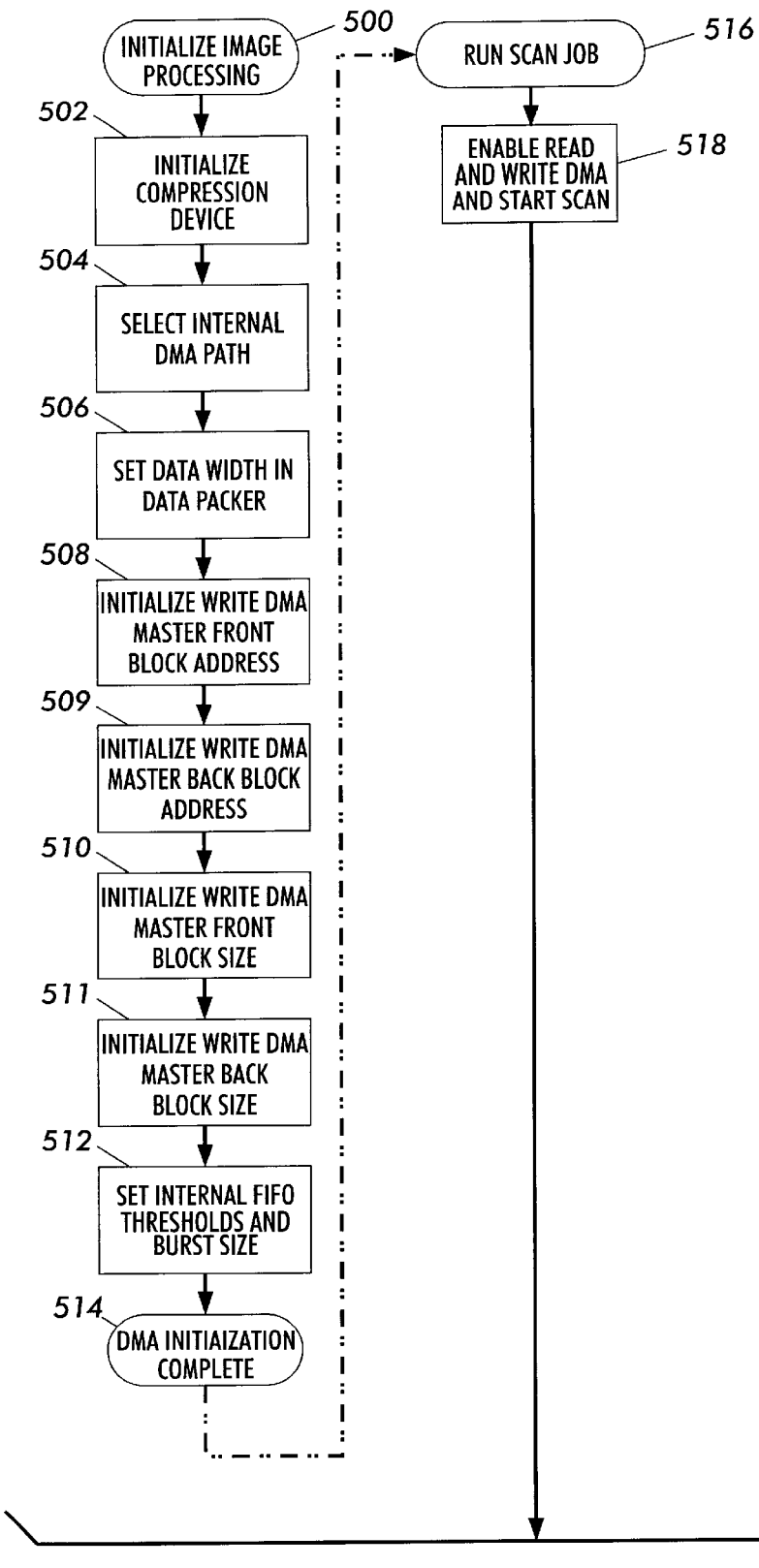
FIGS. 6–8 are flow charts illustrating the direct memory access control system in accordance with the present invention.
Figure 7:
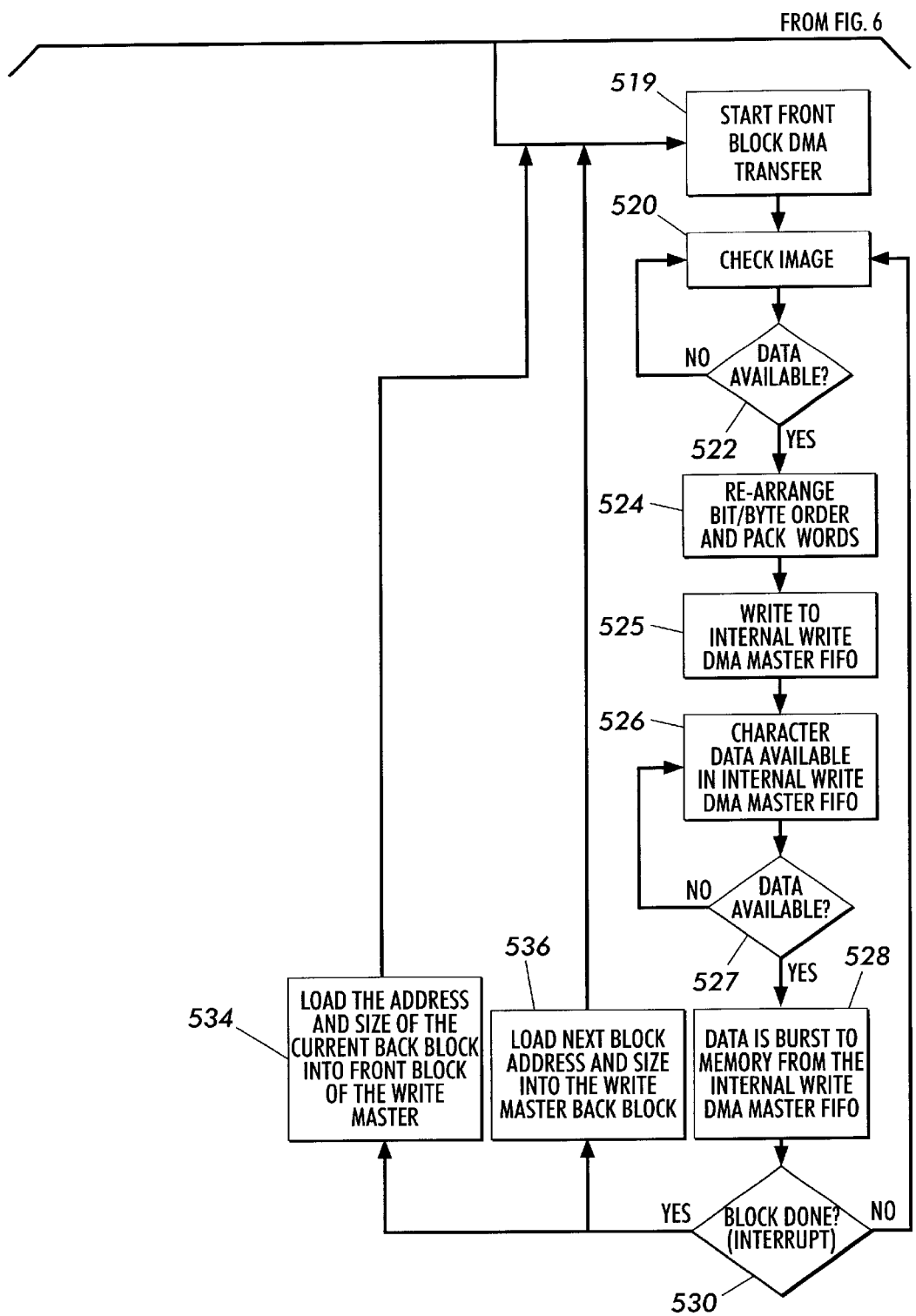
Figure 8:
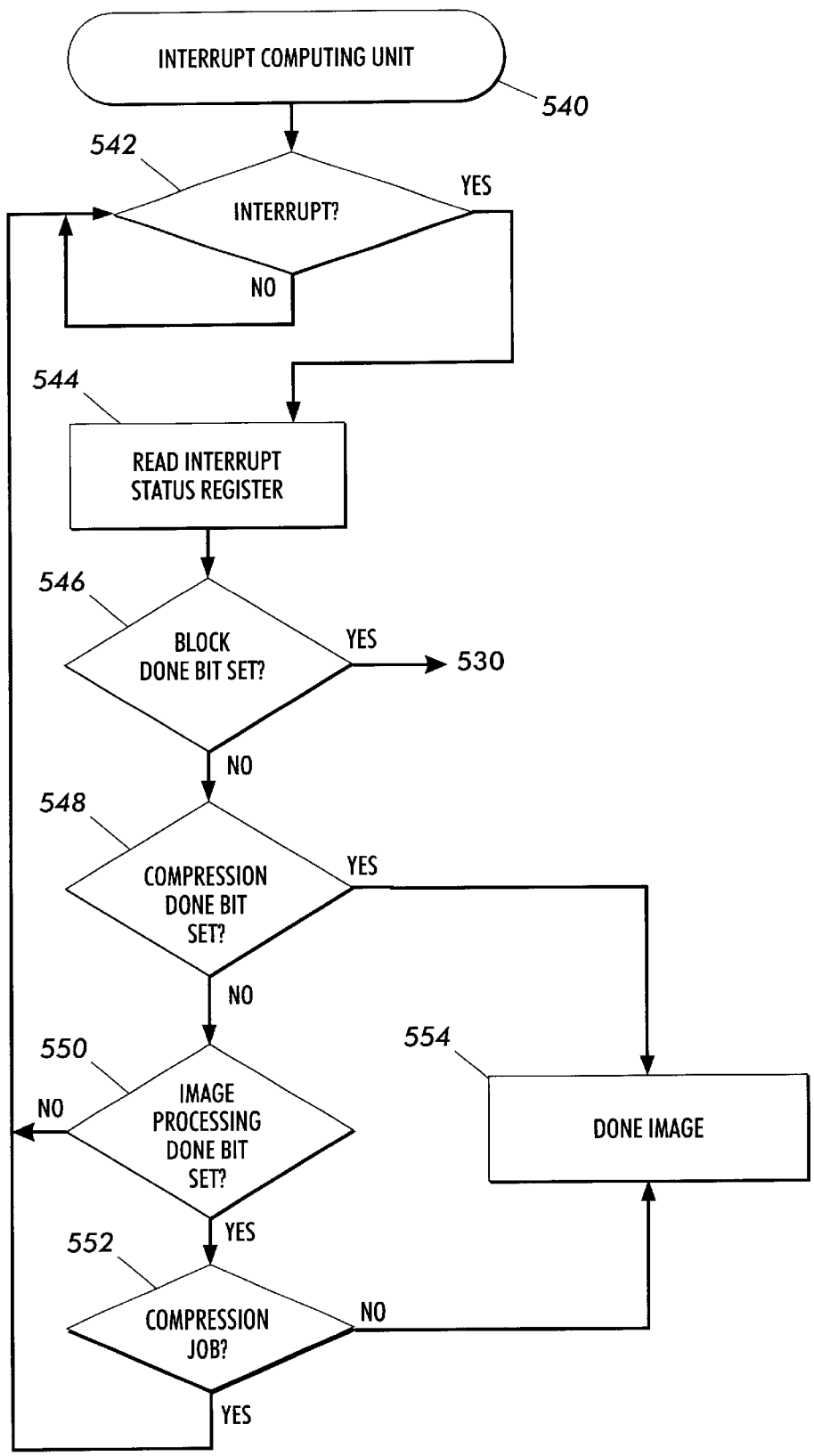

FIGS. 6–8 are flow charts illustrating the direct memory access control system for a scan in accordance with the present invention. The image processing unit 70 is initialized (500) and the compression devices ITU G3/G4 80 and JPEG 85 are initialized (502). The internal direct memory access path from the ITU G3/G4 80 or the JPEG 85 is selected by the computing unit 110 by way of the data selector 415 (504) based on the scan command parameters entered at the graphical user interface by the operator or user. The computing unit 110 sets the data width (length of word) in the data packer 420 (506). The Write DMA Master front block address (508), the Write DMA Master back block address (509), the Write DMA Master front block size (510) and the Write DMA Master back block size (511) are initialized by the computing unit 110 so that the PCI Write DMA Master 430 stores the digital data in the desired location in memory 100. The DMA Write Master internal FIFO 435 threshold and burst size are set (512).

Once the initialization of the PCI DMA Controller 90 is completed (514), the scan job can be run (516), the Write DMA Master 430 is enabled (518). Thereafter, the scanning unit 20 is instructed by computing unit 110 to begin the scan (518). The front block DMA transfer of digital data (image data) to memory 100 begins (519). The FIFO 75 is checked by the data packer 420 for digital (image) data (520). If the image data is unavailable, then data packer 420 waits for the image data to become available (522). Once the digital data (image data) becomes available, then the order of the data bits or data bytes are rearranged and packed into words by the data packer 420 (524), and the words are written into the FIFO 435 in the PCI Write DMA Master 430 (525). The PCI Write Master 430 checks for digital data availability in the FIFO 435 of the PCI Write DMA Master (526). If digital data is unavailable, the PCI Write Master 430 waits until the digital data is available (527). Once the digital data is available, the digital data is written to memory 100 by the PCI Write DMA Master 430 (528).

If the transfer of a block of digital data is incomplete (530), then the PCI DMA Controller 90 checks for additional digital data (image data) (520). If the block of digital data has been completely stored, the front block address and front block size are updated with the current back block address and back block size (534). In addition, the next address and block size are loaded into the PCI Write DMA Master 430 back block registers (536) by the computing unit 110. This is repeated until all of the blocks of digital (image) data are stored in memory 100.

The computing unit 110 is notified of image completion by an interrupt from the PCI DMA Controller 90 as shown in steps 540, 542 of FIG. 8. The computing unit 110 services the interrupt by reading a register in the PCI Slave 440 of the PCI DMA Controller 90 called the "interrupt status register" (544). This register contains a bit for an interrupt from the Write and Read Masters 430, 450 (546), the compressors (ITU G3/G4 80 and JPEG 85) (548), and the image processing unit 70 (550). The computing unit 110 can expect interrupts from the ITU G3/G4 80, the JPEG 85, the PCI Write DMA Master 430 and/or the PCI Read DMA Master 450 indicating that processing and/or transfer is complete.

The computing unit 110 reads the interrupt status register to find out which device or action has been completed. From this information, the computing unit 110 can find out if the current image data transfer and processing is complete (image done) (554). If compression of the digital data is not complete, the compression bit is not set (548) and the image processing conducted by the image processing unit 70 continues until the image processing is completed (550). If the image processing is not done, then the image processing done bit is not set (550) and the image processing conducted by the image processing unit 70 continues until the image processing is completed (550). If the image is being compressed by the ITU G3/G4 80 or the JPEG 85, the compression job is complete when the compression device (ITU G3/G4 80 or the JPEG 85) sends an interrupt to the computing 110 (542, 548). The bypass (uncompressed) job is completed when image processing unit 70 interrupts the computing unit 110 (542, 550). If the job is a compressed job, the image processing interrupt can still be set, but the compression interrupt indicates job completion. Therefore, the computing unit 110 qualifies the image processing interrupt by whether the job is a compression job (552). In either case, the final image size can be calculated by adding up the number of blocks sent and reading the Write DMA Master 430 address register to calculate the size of the last block transferred. This is because the last block is typically a partial block.

Figure 9:
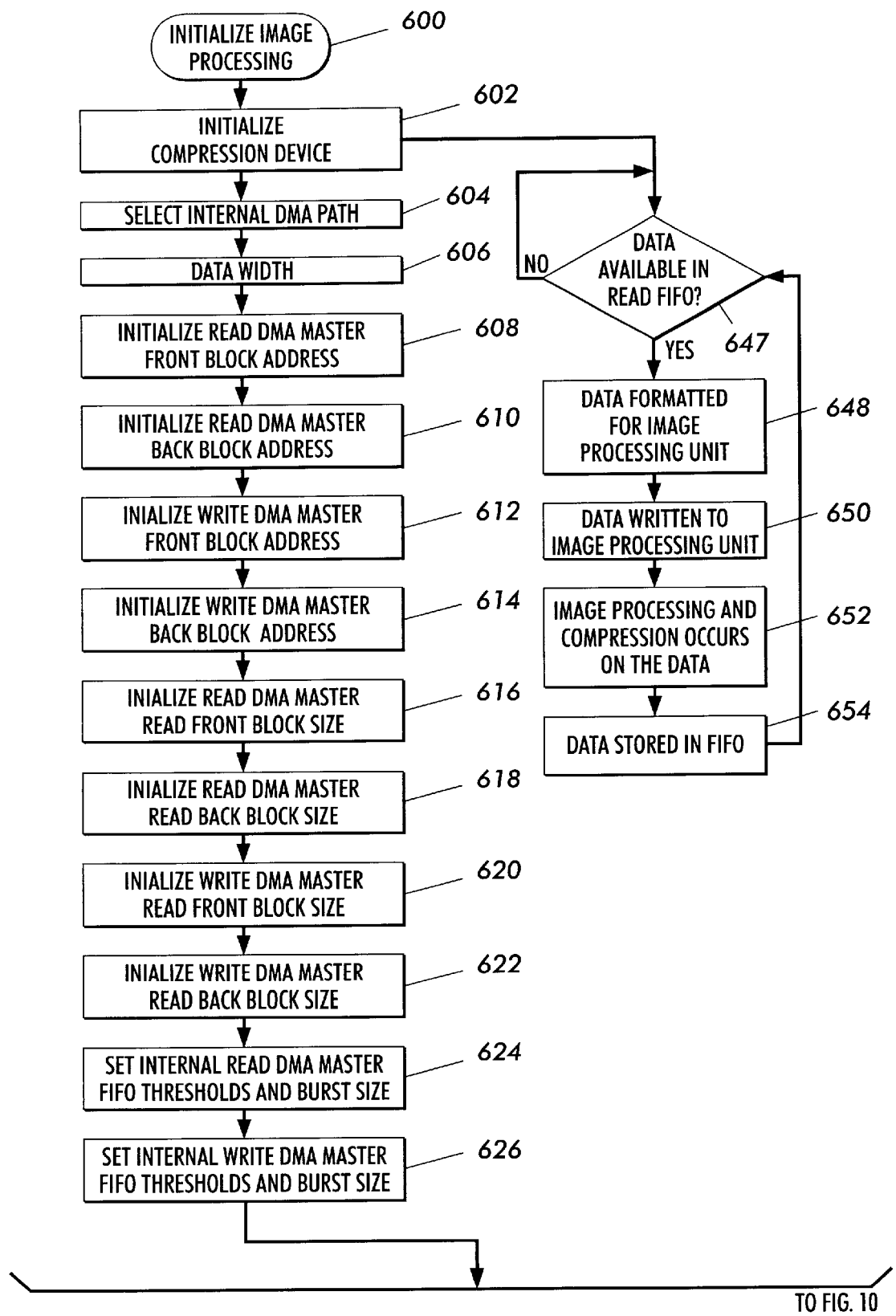
FIGS. 9–11 are flow charts illustrating the loopback embodiment of the present invention.
Figure 10:
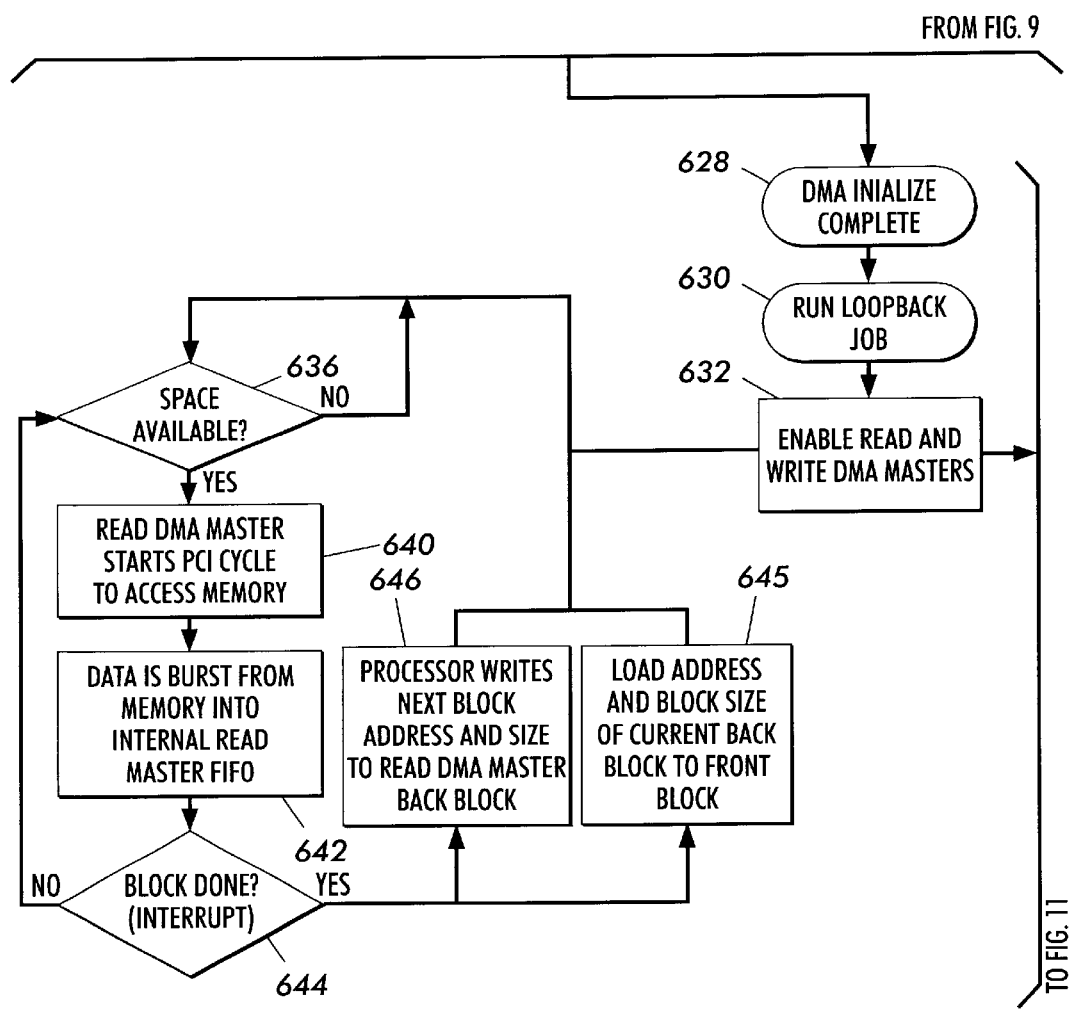
Figure 11:
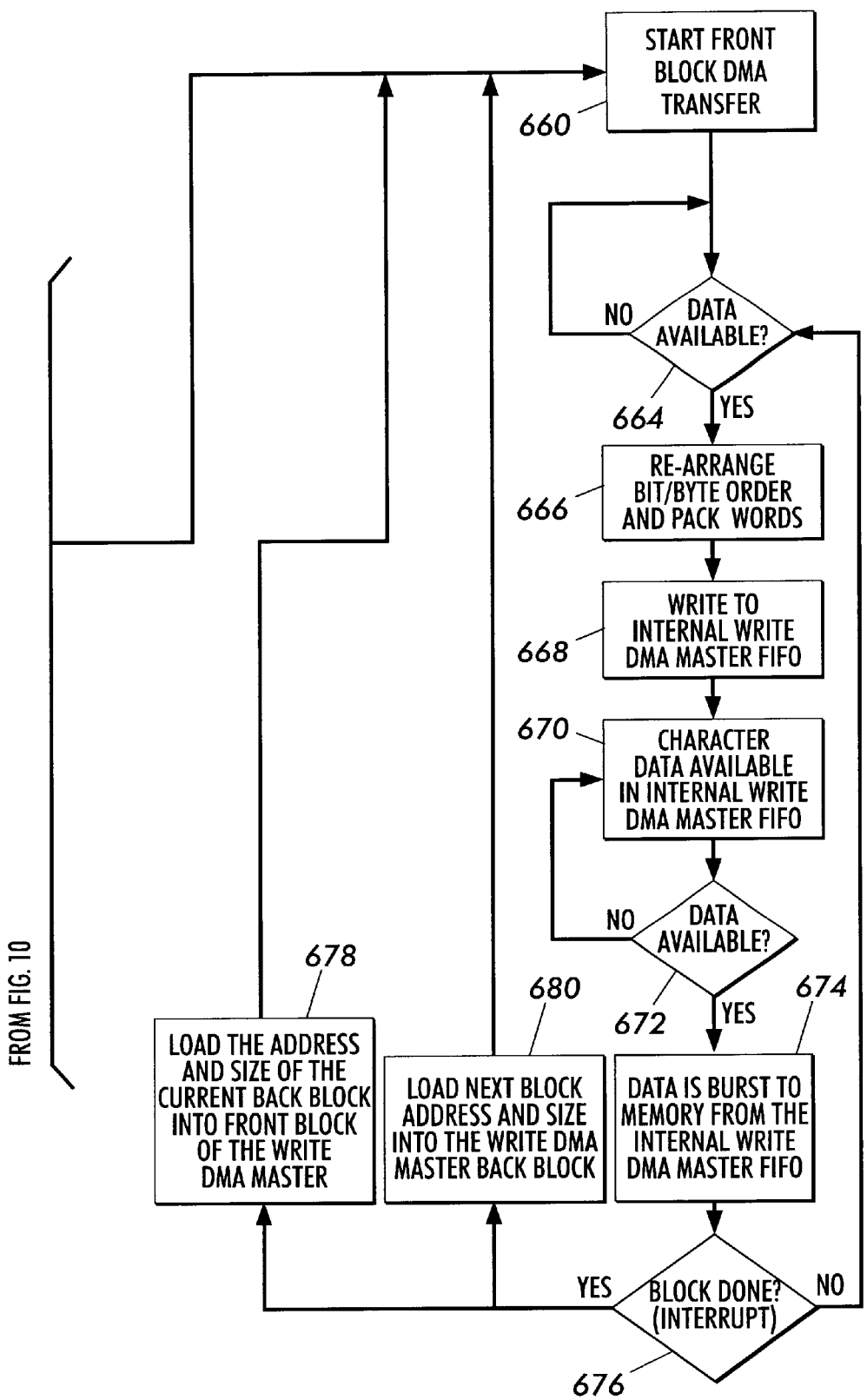

In another embodiment of the present invention, the operator or user can further process a previously scanned image using a loopback process. FIGS. 9–11 are flow charts illustrating loopback embodiment of the direct memory access control system in accordance with the present invention. The Write DMA Master 430 initialization is generally the same as shown in FIG. 6. However, the Read DMA Master 450 is also initialized to supply digital data (image data) stored in the memory 100 instead of the digital data (image data) being supplied by the scanner 20.(This digital data may have initially been transferred from the workstation 50, network 54, internet, etc. to the digital scanner 30 and then written into memory 100 using the scanner interface 40, and video bus 95. Also, images could have just been scanned by scanning unit 20 of digital scanner 30 and the operator wishes additional processing by running the digital data through the loopback process.)

More specifically, as shown in FIGS. 8–11, the image processing unit 70 is initialized (600) and the compression devices ITU G3/G4 80 and JPEG 85 are initialized (602). The internal direct memory access path from the ITU G3/G4 80 or the JPEG 85 is selected by the computing unit 110 by way of the data selector 415 (604) based on the scan command parameters entered at the graphical user interface by the operator or user. The data width (length of word) in the data packer 420 is set (606). The Read Master front block address and the Read Master back block address are initialized (608, 610), and the Write Master front block address and the Write Master back block address are initialized (612,614). The Read Master front block size and the Read Master back block size are initialized (616, 618), and the Write Master front block size and the Write Master back block size are initialized (620,622). The internal Read Master FIFO 455 threshold and burst size are set (624), and the internal Write Master FIFO 435 threshold and burst size are set (626).

Once the DMA initialization is complete (628), then the loopback process of a job begins (630), and the PCI Read DMA Master 450 and the Write DMA Master 430 are enabled (632). The PCI Read DMA Master 450 checks for space available in Read DMA Master internal FIFO 455 (636), and waits for space available (636). The Read DMA Master 450 starts PCI cycle to access memory 100 (640). Digital data is retrieved from memory 100 in bursts to the internal Read DMA Master FIFO 455 (642). When data is available, image data is read from the internal Read Master FIFO 455 by the bus control logic 400 and written to the image processing unit 70. If the block of digital data has not been completely read (644), then steps 636 through 644 are repeated until the block is completely read.

Once a block of digital data has been read (644), computing unit 110 loads the address and block size of the current back block to the front back block (645) and writes the next block address and size to the Read Master back block (646).

While additional digital data is being retrieved from memory 100 by the Read DMA Master 450, the digital data, which has been retrieved from memory 100 and stored in the Read DMA Master FIFO 455 as discussed above, is concurrently processed by the image processor 70 as shown in FIG. 8. Data is written into the image processing unit 70 from the Read Master internal FIFO 455 by the bus control logic 400 (647). If the data is unavailable, the bus control logic 400 waits for the digital data to become available (647). Once the digital data becomes available, the digital data is formatted for image processing unit 70 by the bus control logic 400 (648).

The digital data is written to image processing unit 70 (650), and the image processing unit 70 processes the image data in accordance with instructions, which were previously inputted by an operator by way of the graphical user interface (652). The digital data is stored in the FIFO 75 (654). The Read Master FIFO 455 is checked for available digital data (647) and steps 648 through 654 are repeated until all of the digital data has been processed. Concurrently, the Read Master FIFO 455 is also checked for available space (636) and steps 636 through 646 are repeated until each block of digital data has been completely read from memory 100 in step 644 and written into the Read Master FIFO 455 for processing by the image processor 70 to perform the loopback job.

While digital data is being retrieved from memory 100, processed by image processing unit 70, and stored in FIFO 75, the loopback process is concurrently transferring processed digital data back into memory 100 through Write DMA Master 430.

The front block DMA transfer of digital data (image data) to memory begins (660). The FIFO 75 is checked by the data packer 420 for digital data (image data) (664). If the image data is unavailable, then data packer 420 waits for the image data to become available (664). Once the digital (image) data becomes available, then the order of the data bits or data bytes are rearranged and packed into words by the data packer 420 (666), and the words are written into the FIFO in the PCI Write DMA Master 430 (668). The Write DMA Master 430 checks for digital data availability in the FIFO 435 of the PCI Write DMA Master 430 (670). If digital data is unavailable, the Write DMA Master 430 waits until the digital data is available (672). Once the digital data is available, the digital data is written to memory 100 by the PCI Write DMA Master 430 (674).

If the block of digital data is incomplete (676), then the PCI DMA Controller 90 checks for additional digital data (image data) (664) and continues transfer by way of steps 666–676. If the block of digital data has been stored, the front block address and front block size are updated with the current back block address and back block size (678) and another transfer begins. In addition, in parallel with the current transfer, the next address and block size are loaded into the PCI Write DMA Master 430 back block registers (680). This is repeated until all of the images are stored in memory 100. Also, in parallel, digital data is being processed by the image processing unit 70 as described with reference to FIG. 8 above.

Image processing available in the scanner has been used to process already existing image data (digital data). This allows an existing image to be cropped, scale filtered, descreened, undergo pixel depth change, and to be otherwise processed to provide an enhanced image or to prepare the image for further processing by other devices.

Figure 12:
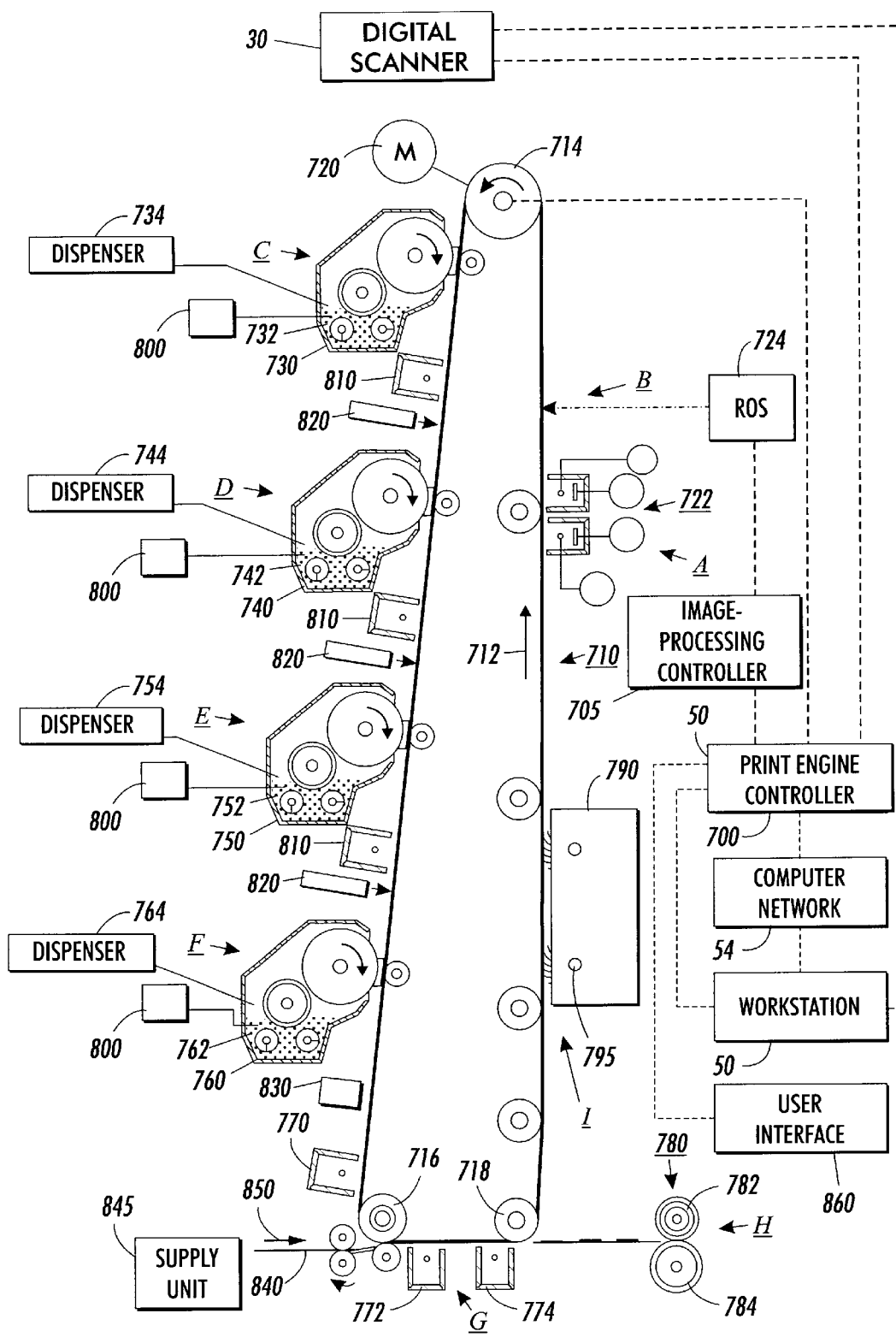
FIG. 12 is a partial schematic elevational view of an example of a digital imaging system, including a print engine, which can employ the scanner and direct memory access control system of the present invention.

FIG. 12 is a partial schematic view of a print engine of a digital imaging system, which includes a scanner having the direct memory access control system of the present invention. The imaging system is used to produce color output in a single pass of a photoreceptor belt. It will be understood, however, that it is not intended to limit the invention to the embodiment disclosed. On the contrary, it is intended to cover all alternatives, modifications and equivalents as may be included within the spirit and scope of the invention as defined by the appended claims, including a multiple pass color process system, a single or multiple pass highlight color system and a black and white printing system.

In one embodiment, an original document can be positioned in a document handler 29 or on a platen 24 of a digital scanner 30. The digital scanner 30 captures the original document (images) and converts it to digital data. This information is transmitted to an electronic subsystem (ESS) or print engine controller 700. Alternatively, digital scanner 30 captures the original document and converts it to digital data, and transmits the digital data to the workstation 50. The workstation 50 supplies the digital data to print engine controller 700. Alternatively, image signals may be supplied by a computer network 54 to print engine controller 700 by way of a workstation 50. An image-processing controller 705 receives the document information from the print engine controller 700 and converts this document information into electrical signals for the raster output scanner.

Modern scanners connected to copiers, printers, computers, networks, facsimile machines, etc. are capable of scanning and producing complex and interesting page images. The pages may include text, graphics, and scanned or computer-generated images. The image of a page may be described as a collection of simple image components or primitives (characters, lines, bitmaps, colors, etc.). Complex pages can then be built by specifying a large number of the basic image primitives. This is done in software using a page description language such as PostScript. The job of the electronic printer's software is to receive and interpret each of the imaging primitives for the page. The drawing or rasterization must be done on an internal, electronic model of the page. All image components must be collected and the final page image must be assembled before marking can begin. The electronic model of the page is often constructed in a data structure called an image buffer. The data contained is in the form of an array of color values called pixels. Each actual page and the pixel's value give the color, which should be used when marking. The pixels are organized to reflect the geometric relation of their corresponding spots. They are usually ordered to provide easy access in the raster pattern required for marking.

The printing machine preferably uses a charge retentive surface in the form of an Active Matrix (AMAT) photoreceptor belt 710 supported for movement in the direction indicated by arrow 712, for advancing sequentially through the various xerographic process stations. The photoreceptor belt 710 is entrained about a drive roller 714, tension rollers 716 and fixed roller 718 and the drive roller 714 is operatively connected to a drive motor 720 for effecting movement of the photoreceptor belt 710 through the xerographic stations. A portion of photoreceptor belt 710 passes through charging station A where a corona generating device, indicated generally by the reference numeral 722, charges the photoconductive surface of photoreceptor belt 710 to a relatively high, substantially uniform, preferably negative potential.

Next, the charged portion of photoconductive surface is advanced through an imaging/exposure station B. At imaging/exposure station B, the print engine controller 700 receives the image signals representing the desired output image from the digital scanner 30 directly, computer network 54, or work station 50 and processes these signals to convert them to the various color separations of the image. The desired output image is transmitted to a laser based output scanning device, which causes the charge retentive surface to be discharged in accordance with the output from the scanning device. Preferably the laser based scanning device is a laser Raster Output Scanner (ROS) 724. Alternatively, the ROS 724 could be replaced by other xerographic exposure devices such as an LED array.

The photoreceptor belt 710, which is initially charged to a voltage $V_0$, undergoes dark decay to a level equal to about −500 volts. When exposed at the exposure station B, it is discharged to a level equal to about −50 volts. Thus after exposure, the photoreceptor belt 710 contains a monopolar voltage profile of high and low voltages, the former corresponding to charged areas and the latter corresponding to discharged or background areas.

At a first development station C, the development station C preferably utilizes a hybrid development system including a developer structure 730. The development roll, better known as the donor roll, is powered by two development fields (potentials across an air gap). The first field is the ac field which is used for toner cloud generation. The second field is the dc development field which is used to control the amount of developed toner mass on the photoreceptor belt 710. The developer structure 730 contains magenta toner particles 732. The toner cloud causes charged magenta toner particles 732 to be attracted to the electrostatic latent image. Appropriate developer biasing is accomplished via a power supply (not shown). This type of system is a noncontact type in which only toner particles (magenta, for example) are attracted to the latent image and there is no mechanical contact between the photoreceptor belt 710 and a toner delivery device to disturb a previously developed, but unfixed, image. A toner concentration sensor 800 senses the toner concentration in the developer structure 730. A dispenser 734 dispenses magenta toner into the developer structure 730 to maintain a proper toner concentration. The dispenser 734 is controlled by print engine controller 700.

The developed but unfixed image is then transported past a second charging device 810 where the photoreceptor belt 710 and previously developed toner image areas are recharged to a predetermined level.

A second exposure/imaging is performed by device 820 which preferably comprises a laser based output structure. The device 820 is utilized for selectively discharging the photoreceptor belt 710 on toned areas and/or bare areas, pursuant to the image to be developed with the second color toner. Device 820 may be a raster output scanner or LED bar, which is controlled by print engine controller 700. At this point, the photoreceptor belt 710 contains toned and untoned areas at relatively high voltage levels and toned and untoned areas at relatively low voltage levels. These low voltage areas represent image areas which are developed using discharged area development (DAD). To this end, a negatively charged, developer material 742 comprising the second color toner, preferably yellow, is employed. The second color toner is contained in a developer structure 740 disposed at a second developer station D and is presented to the latent images on the photoreceptor belt 710 by way of a second developer system. A power supply (not shown) serves to electrically bias the developer structure 740 to a level effective to develop the discharged image areas with negatively charged yellow toner particles 742. Further, a toner concentration sensor 800 senses the toner concentration in the developer structure 740. A dispenser 744 dispenses magenta toner into the developer structure 740 to maintain a proper toner concentration. The dispenser 744 is controlled by print engine controller 700.

The above procedure is repeated for a third image for a third suitable color toner such as cyan 752 contained in developer structure 750 and dispenser 754 (station E), and for a fourth image and suitable color toner such as black 762 contained in developer structure 760 and dispenser 764 (station F). Preferably, developer structures 730, 740, 750 and 760 are the same or similar in structure. Also, preferably, the dispensers 734, 744, 754 and 764 are the same or similar in structure. The exposure control scheme described below may be utilized for these subsequent imaging steps. In this manner a full color composite toner image is developed on the photoreceptor belt 710. In addition, a permeability sensor 830 measures developed mass per unit area (developability). Although only one sensor 830 is shown in FIG. 8, there may be more than one sensor 830.

To the extent to which some toner charge is totally neutralized, or the polarity reversed, thereby causing the composite image developed on the photoreceptor belt 710 to consist of both positive and negative toner, a negative pre-transfer dicorotron member 770 is provided to condition all of the toner for effective transfer to a substrate.

Subsequent to image development a sheet of support material 840 is moved into contact with the toner images at transfer station G. The sheet of support material 840 is advanced to transfer station G by the supply unit 845 in the direction of arrow 850. The sheet of support material 840 is then brought into contact with photoconductive surface of photoreceptor belt 710 in a timed sequence so that the toner powder image developed thereon contacts the advancing sheet of support material 840 at transfer station G.

Transfer station G includes a transfer dicorotron 772 which sprays positive ions onto the backside of support material 840. This attracts the negatively charged toner powder images from the photoreceptor belt 710 to support material 840. A detack dicorotron 774 is provided for facilitating stripping of the sheets from the photoreceptor belt 710.

After transfer, the sheet of support material 840 continues to move onto a conveyor (not shown) which advances the sheet to fusing station H. Fusing station H includes a fuser assembly, indicated generally by the reference numeral 780, which permanently affixes the transferred powder image to support material 840. Preferably, fuser assembly 780 comprises a heated fuser roller 782 and a backup or pressure roller 784. Support material 840 passes between fuser roller 782 and backup roller 784 with the toner powder image contacting fuser roller 782. In this manner, the toner powder images are permanently affixed to support material 840. After fusing, a chute, not shown, guides the advancing sheets 28 to a catch tray, stacker, finisher or other output device (not shown), for subsequent removal from the printing machine by the operator.

After the sheet of support material 840 is separated from photoconductive surface of photoreceptor belt 710, the residual toner particles carried by the non-image areas on the photoconductive surface are removed therefrom. These particles are removed at cleaning station I using a cleaning brush or plural brush structure contained in a housing 790. The cleaning brush 795 or brushes 795 are engaged after the composite toner image is transferred to a sheet. Once the photoreceptor belt 710 is cleaned the brushes 795 are retracted utilizing a device incorporating a clutch (not shown) so that the next imaging and development cycle can begin.

Print engine controller 700 regulates the various printer functions. The print engine controller 700 preferably includes one or more programmable controllers, which control printer functions hereinbefore described. The print engine controller 700 may also provide a comparison count of the copy sheets, the number of documents being recirculated, the number of copy sheets selected by the operator, time delays, jam corrections, etc. The control of all of the exemplary systems heretofore described may be accomplished automatically, through the use of user interface 860 from the printing machine consoles selected by an operator, or through the use of a workstation 50 selected by the operator. Conventional sheet path sensors or switches may be utilized to keep track of the position of the document and the copy sheets.

While FIG. 12 shows an example of a digital imaging system incorporating the digital scanner 30 including the direct memory access system of the present invention, it is understood that this method and apparatus could be used in any imaging system having any number of developer structures.

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

What is claimed is:

1. A direct memory access controller, coupled to a data compression unit and FIFO, for storing digital data in a memory comprising:
   a compression and decompression bus control logic unit;
   a bypass interface;
   a data selector;
   a computing unit instructing the data selector to select the routing of digital data by way of the bypass interface or by way of the compression and decompression bus control logic unit;
   a data packer receiving the selected digital data from the data selector and packing the digital data into words; and
   a write DMA master receives the words of digital data from the data packer and places the words into blocks of digital data and stores the blocks of digital data in the memory.

2. The direct memory access controller as in claim 1, wherein the blocks of digital data are transferred from the direct memory access controller to the memory by way of a video bus.

3. The direct memory access controller as in claim 1, wherein the data compression unit is one of a JPEG and ITU G3/G4.

4. The direct memory access controller as in claim 1, further comprising a second data compression unit, wherein the data compression unit is an ITU G3/G4 and the second data compression unit is a JPEG.

5. The direct memory access controller as in claim 1, wherein the data selector transmits the selected data in packets to the data packer.

6. The direct memory access controller as in claim 5, wherein the data packets comprise one of eight bits, sixteen bits and 24 bits.

7. The direct memory access controller as in claim 1, wherein the data packer rearranges the digital data to form words of digital data having a required bit length.

8. The direct memory access controller as in claim 7, wherein the bit length of the words is thirty-two.

9. The direct memory access controller as in claim 1, wherein the write DMA master includes registers.

10. The direct memory access controller as in claim 9, wherein the registers configure starting addresses and block size for a front block of digital data and a back block of digital data in the write DMA master, wherein the front block of digital data is the block of digital data currently being transferred by the write DMA master and the back block of digital data is the next block of digital data to be transferred by the write DMA master.

11. The direct memory access controller as in claim 10, wherein the back block of digital data is subsequently copied into the front block for transfer and the write DMA master subsequently interrupts a computing unit, which transmits the new address and block size of the next back block.

12. The direct memory access controller as in claim 1, wherein the write DMA master includes an internal FIFO.

13. The direct memory access controller as in claim 12, wherein the write DMA master monitors the write DMA master internal FIFO threshold so that when enough digital data has been written to the internal FIFO, the digital data is burst onto a video bus for storage in the memory.

14. The direct memory access controller as in claim 1, wherein the write DMA master includes an address counter, a data counter and a main state machine for video bus phase control.

15. Direct memory access method for storing digital data, comprising:
    (a) initializing DMA controller having a write DMA master;
    (b) scanning images to provide digital data to a data packer;
    (A c) writing words of digital data from data packer to write DMA master internal FIFO;
    (d) writing digital data to memory starting at the front block address in bursts until the transfer of digital data for the front block is completed;
    (e) loading write DMA master back block address and size into front block and next block address and size into write DMA master front block; and
    (f) repeating steps (c) through (e) while performing step (c) until all of the images are scanned and all of the digital data is stored in memory.

16. The method as in claim 15, wherein the digital data is compressed by a data compression unit before the data packer receives the digital data.

17. The method as in claim 16, wherein the data compression unit is one of a JPEG and ITU G3/G4.

18. The method as in claim 15, further comprising selecting a data compression unit from a plurality of data compression units to compress the digital data and compressing the digital data before the data packer receives the digital data.

19. The method of claim 18, wherein the data compression units are a JPEG and ITU G3/G4.

20. A direct memory access method for storing digital data, comprising:
    (a) initializing image processing unit and data compression unit;
    (b) selecting path of digital data in DMA controller;
    (c) setting width of words of digital data in data packer;
    (d) initializing write DMA master front block and back block addresses and sizes;
    (e) setting threshold and burst size of write DMA master internal FIFO;
    (f) enabling write DMA master;
    (g) scanning images to provide digital data;
    (h) writing words of digital data from data packer to write DMA master internal FIFO for front block;
    (i) writing digital data to memory starting at the front block address in bursts until the transfer of digital data for the front block is completed;
    (j) loading write DMA master back block address and size into front block and next block address and size into write DMA master front block; and
    (k) repeating steps (h) through (j) while performing step (g) until the transfer of digital data is complete.

* * * * *